United States Patent
Hari et al.

(10) Patent No.: US 9,992,108 B2
(45) Date of Patent: Jun. 5, 2018

(54) PACKET FORWARDING BASED ON PATH ENCODING

(71) Applicants: Adiseshu Hari, Holmdel, NJ (US); Urs Niesen, Summit, NJ (US); Gordon Wilfong, Florham Park, NJ (US)

(72) Inventors: Adiseshu Hari, Holmdel, NJ (US); Urs Niesen, Summit, NJ (US); Gordon Wilfong, Florham Park, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 0 days. days.

(21) Appl. No.: 14/337,815

(22) Filed: Jul. 22, 2014

(65) Prior Publication Data
US 2016/0028625 A1    Jan. 28, 2016

(51) Int. Cl.
H04L 12/28    (2006.01)
H04L 12/741   (2013.01)
H04L 12/801   (2013.01)
H04W 36/30    (2009.01)
H04L 12/715   (2013.01)

(52) U.S. Cl.
CPC ........... H04L 45/74 (2013.01); H04L 45/64 (2013.01); H04L 47/34 (2013.01); H04W 36/30 (2013.01)

(58) Field of Classification Search
USPC ................................................ 370/280, 92
See application file for complete search history.

(56) References Cited

U.S. PATENT DOCUMENTS

| | | | |
|---|---|---|---|
| 2003/0142669 A1* | 7/2003 | Kubota et al. | 370/389 |
| 2006/0109829 A1* | 5/2006 | O'Neill | 370/338 |
| 2010/0124231 A1* | 5/2010 | Kompella | 370/401 |
| 2011/0149962 A1* | 6/2011 | Ait-Ameur | 370/392 |
| 2012/0113896 A1* | 5/2012 | Karol | H04W 40/08 370/328 |

* cited by examiner

*Primary Examiner* — Mohammad Anwar
*Assistant Examiner* — Angel Brockman
(74) *Attorney, Agent, or Firm* — Tong, Rea, Bentley & Kim, LLC

(57) ABSTRACT

In general, a capability for forwarding packets based on path encoding is presented. The capability for forwarding a packet based on path encoding may be configured to enable forwarding of a packet along a network path by determining a path encoding label for the network path, associating the path encoding label for the network path with the packet, and forwarding the packet along the network path based on the path encoding label associated with the packet. The network path for a packet may include an ordered sequence of node output interfaces of an ordered sequence of nodes. The path encoding label for the network path includes an ordered sequence of node interface labels corresponding to the ordered sequence of node output interfaces of the nodes of the network path. The nodes of the network path forward the packet along the network path based on the path encoding label.

24 Claims, 9 Drawing Sheets

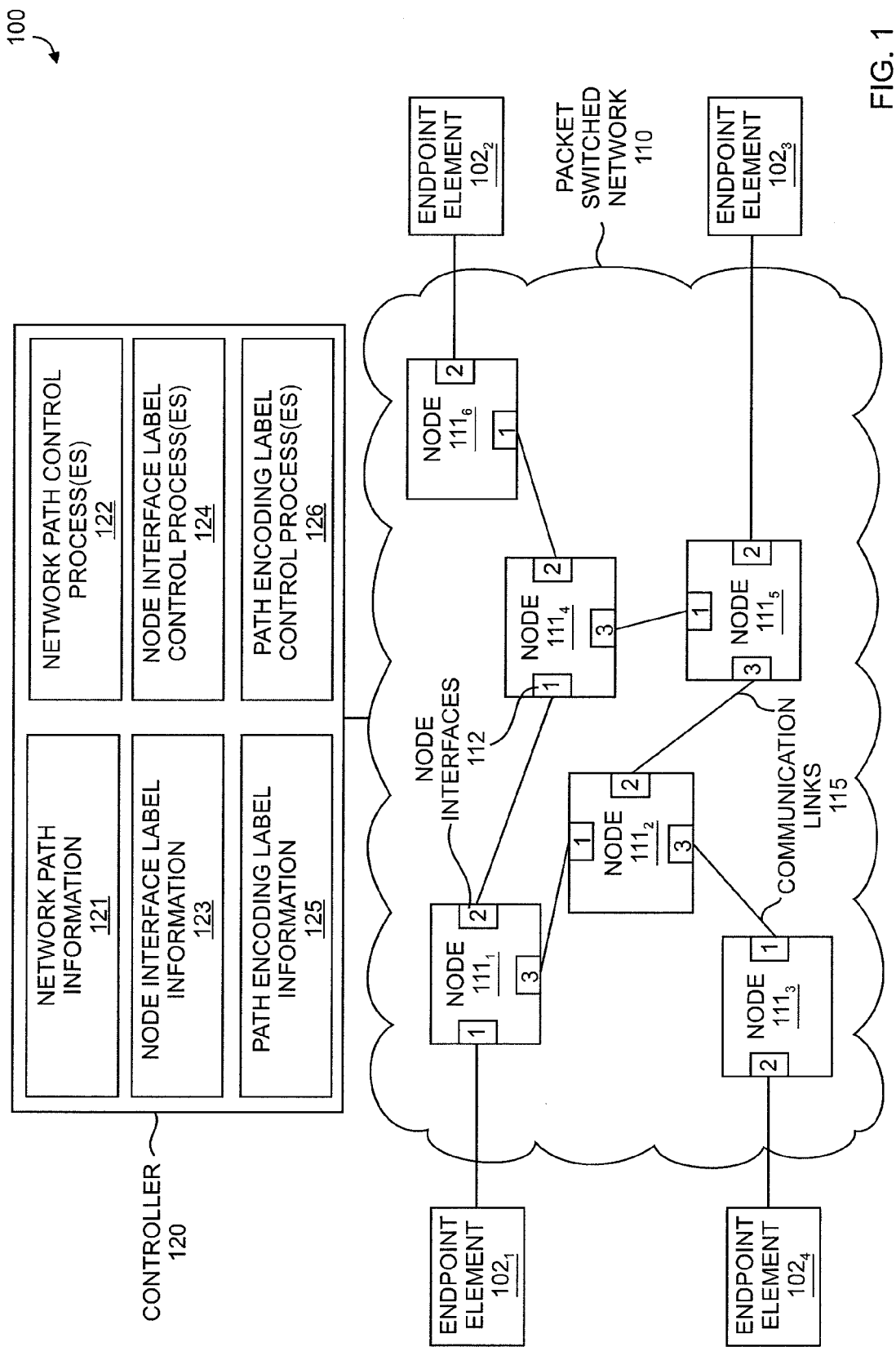

| SOURCE ADDRESS | DESTINATION ADDRESS | NETWORK PATH DESCRIPTION |
|---|---|---|
| $102_1$ | $102_3$ | $111_1$ [INT 3], $111_2$ [INT 2], $111_5$ [INT2] |
| $102_4$ | $102_2$ | $111_3$ [INT1], $111_2$ [INT2], $111_5$ [INT1], $111_6$ [INT2] |
| ⋮ | ⋮ | ⋮ |

NETWORK PATH MAPPING INFORMATION 210

| INTERFACE IDENTIFIER | NODE INTERFACE LABEL |
|---|---|
| 1 | 0 |
| 2 | 10 |
| 3 | 11 |

NODE INTERFACE LABEL MAPPING INFORMATION 220

| SOURCE ADDRESS | DESTINATION ADDRESS | PATH ENCODING LABEL |
|---|---|---|
| $102_1$ | $102_3$ | 110110 |
| $102_4$ | $102_2$ | 001010 |
| ⋮ | ⋮ | ⋮ |

PATH ENCODING LABEL MAPPING INFORMATION 230

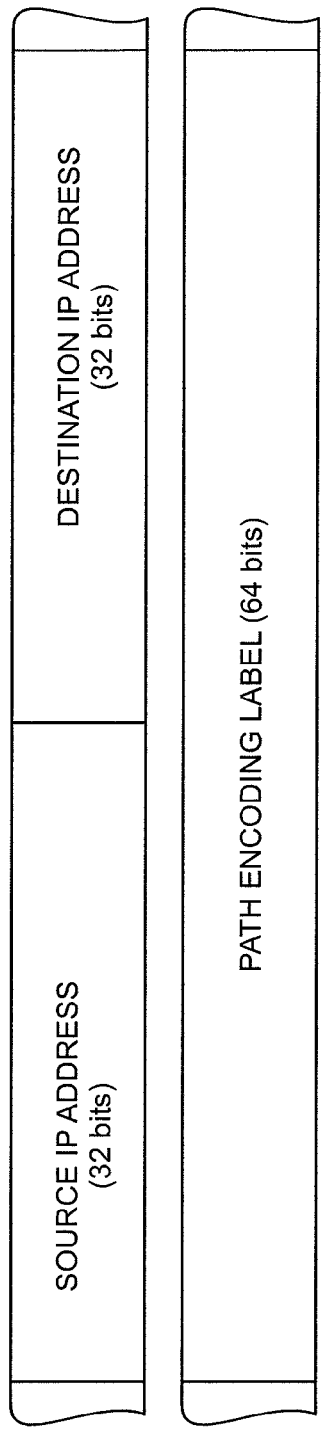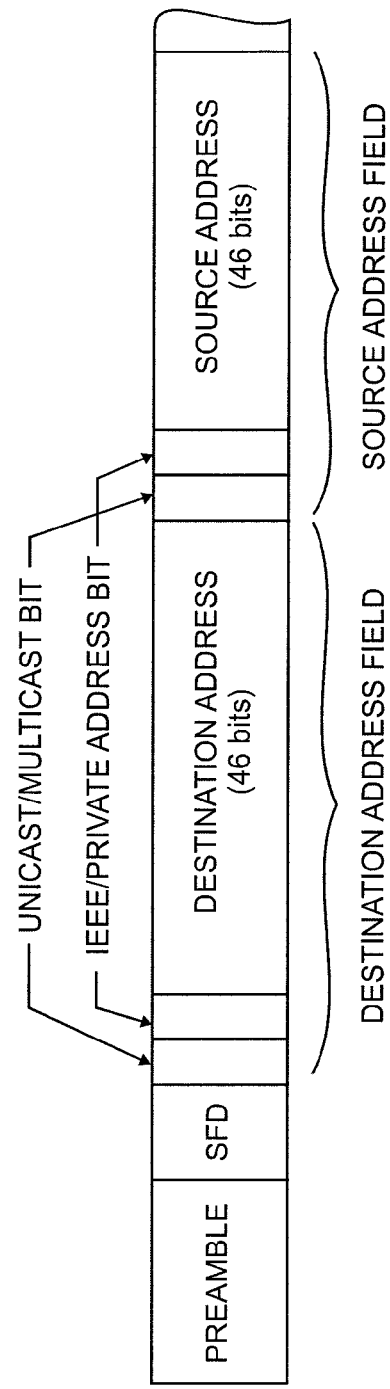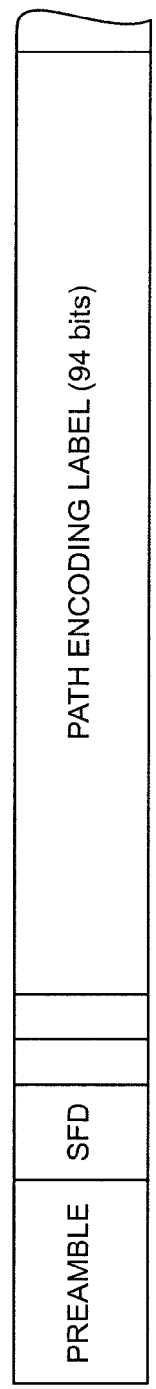
FIG. 3D
FIG. 3E

PACKET FORWARDING BASED ON PATH ENCODING

TECHNICAL FIELD

The disclosure relates generally to communication networks and, more specifically but not exclusively, to forwarding of packets in communication networks.

BACKGROUND

In general, a packet switch that is configured to receive a packet and forward the packet to a next hop needs to maintain state information in order for forward the packet. The state information is typically maintained in the form of a lookup table which may be used to determine the next hop to which the packet is routed. The maintenance and use of such lookup tables at the switches of a network is typically quite expensive, since the switches need to maintain respective lookup tables and a network control plane needs to install and maintain the lookup tables at the switches of the network. Additionally, the cost typically increases as the lookup tables become more granular in order to support more sophisticated per flow routing, traffic engineering, service chaining requirements, or the like. For example, classical packet switching (e.g., Ethernet, Internet Protocol (IP), and other classical packet switching techniques and protocols) typically relies on destination address based lookup tables, which can grow very quickly in large networks. This problem is considered to be most acute in Ethernet networks, since aggregation of Ethernet addresses is not possible. While IP networks support aggregation of addresses into prefixes, IP networks typically still have scalability issues with maintaining and updating large lookup tables. Also, while IP networks may support IP source routing, in which a packet that is to be routed to an intended destination includes the address of each device that the packet will traverse on its path to the intended destination, the use of such IP source routing still requires maintenance and use of lookup tables in the switches along the path to the intended destination. Furthermore, while Multiprotocol Label Switching (MPLS) attempts to alleviate this lookup growth and complexity by replacing destination address based lookup with fixed label lookups which are simple to implement, MPLS also requires per MPLS flow state in each switch and, thus, also is unable to eliminate the label lookup from transit MPLS switches, nor the necessity for control state (e.g., in the form of LDP/RSVP-TE and so forth) in order to install the MPLS flow state information in the switches.

SUMMARY OF EMBODIMENTS

Various deficiencies in the prior art may be addressed by embodiments for supporting forwarding of packets based on path encoding.

In at least some embodiments, an apparatus includes a processor and a memory communicatively connected to the processor. The processor is configured to determine a network path including an ordered sequence of node output interfaces of an ordered sequence of nodes, and determine a path encoding label for the network path where the path encoding label includes an ordered sequence of node interface labels representing the node output interfaces of the network path.

In at least some embodiments, a method includes determining, via a processor, a network path including an ordered sequence of node output interfaces of an ordered sequence of nodes, and determining, via the processor, a path encoding label for the network path where the path encoding label includes an ordered sequence of node interface labels representing the node output interfaces of the network path.

In at least some embodiments, an apparatus includes a processor and a memory communicatively connected to the processor. The processor is configured to receive a packet to be routed via a network path including an ordered sequence of node output interfaces of an ordered sequence of nodes, and associate a path encoding label for the network path with the packet where the path encoding label includes an ordered sequence of node interface labels representing the node output interfaces of the network path.

In at least some embodiments, a method includes receiving, via a processor, a packet to be routed via a network path that includes an ordered sequence of node output interfaces of an ordered sequence of nodes, and associating, via the processor, a path encoding label for the network path with the packet where the path encoding label includes an ordered sequence of node interface labels representing the node output interfaces of the network path.

BRIEF DESCRIPTION OF THE DRAWINGS

The teachings herein can be readily understood by considering the following detailed description in conjunction with the accompanying drawings, in which:

FIG. 1 depicts an exemplary communication system configured to support packet forwarding based on path encoding;

FIGS. 3A-3E depict mechanisms for associating a path encoding label with a packet at an edge node of a communication system configured to support packet forwarding based on path encoding;

To facilitate understanding, identical reference numerals have been used, where possible, to designate identical elements common to the figures.

DETAILED DESCRIPTION OF EMBODIMENTS

Figure 2A:
FIGS. 2A-2C depict exemplary network path information, node interface label information, and path encoding label information which may be used for supporting path encoding in a communication system configured to support packet forwarding based on path encoding.

In general, a capability for forwarding packets based on path encoding is presented. In at least some embodiments, the capability for forwarding a packet based on path encoding may be configured to enable forwarding of a packet along a network path by determining path encoding information for the network path, associating the path encoding information for the network path with the packet, and forwarding the packet along the network path based on the path encoding information associated with the packet. In at least some embodiments, the capability for forwarding a packet based on path encoding may be configured to enable forwarding of a packet along a network path by determining a path encoding label for the network path, associating the path encoding label for the network path with the packet, and forwarding the packet along the network path based on the path encoding label associated with the packet. The network path for a packet may include an ordered sequence of node output interfaces of an ordered sequence of nodes to be traversed by the packet. The path encoding label for the network path may include an ordered sequence of node interface labels corresponding to the ordered sequence of node output interfaces of the nodes of the network path. The node interface labels of the path encoding label represent the node output interfaces of the network path represented by the path encoding label. The node interface labels of the path encoding label for the network path also may be said to uniquely identify the output interfaces of successive nodes along the network path. The nodes of the network path forward the packet along the network path based on the path encoding label associated with the packet. The nodes of the network path forward the packet along the network path based on decoding of respective portions of the path encoding label and forwarding the packet via respective node output interfaces of the nodes as indicated by the respective portions of the path encoding label. In this manner, lookup tables typically required at transit nodes of a network for forwarding of packets may be eliminated from the transit nodes, thereby improving the transit nodes (e.g., rendering the transit nodes stateless, reducing latency at the transit nodes, improving the speed and reliability of the transit nodes, reducing the cost of the transit nodes, and so forth), improving the network (e.g., making the network more scalable, supporting routing of packets over arbitrary paths, and so forth), and providing various other advantages. Additionally, in this manner, per-flow state typically maintained at transit nodes of a network may be eliminated from the transit nodes without the need for any new protocols or packet formats while at the same time supporting arbitrary paths on a per flow basis where the flow may be at any suitable level of granularity (e.g., L2, L3, L4, or L5). Accordingly, in at least some embodiments, the path encoding label may be considered to be a self-describing identifier in that the state information typically needed for forwarding of packets along a network path (e.g., state information needed to support use of opaque packet forwarding identifiers, such as an IP or Ethernet address of 0x3456 or a Multiprotocol Label Switching (MPLS) label of 23, where such state information is required to translate such opaque packet forwarding identifiers into next-hop identifiers) is no longer needed at the nodes of the network path. For example, path encoding information of <1,3,4,2,2> for a network path may be used to indicate that packets of the network path are to be output from ports 1, 3, 4, 2, and 2 of the five nodes of which the network path is composed, respectively. It will be appreciated that various embodiments of the capability for forwarding packets based on path encoding may be used for various types of packet routing or switching technologies, such as IP packet routing (e.g., IPv4, IPv6, or the like), Ethernet packet switching, cell switching (e.g., Asynchronous Transfer Mode (ATM)), label switching (e.g., MPLS), or the like, as well as various combinations thereof. It is noted that various embodiments of the capability for forwarding packets based on path encoding may be used within various types of networks (e.g., access networks, core networks, transport networks, wide area networks, transit carrier networks, Internet Service Provider (ISP) networks, enterprise networks, data center networks, or the like, as well as various combinations thereof). It is further noted that various embodiments of the capability for forwarding packets based on path encoding enable implementation of high speed, high performance software switches without the need for hardware assisted address or label lookups, which are particularly well-suited for use in various types of virtualized environments (e.g., for SDN-based networks, network function virtualization (NFV) implementations (e.g., virtualization of Session Initiation Protocol (SIP) unctions, virtualization of Long Term Evolution (LTE) network functions, or the like), cloud applications, or the like. These and various other embodiments and advantages of the capability for forwarding packets based on path encoding may be better understood when considered within the context of an exemplary communication system configured to support forwarding of packets based on path encoding, as depicted in FIG. 1.

FIG. 1 depicts an exemplary communication system configured to support packet forwarding based on path encoding. The exemplary communication system 100 includes four endpoint elements $102_1$-$102_4$ (collectively, endpoint elements 102), a packet switched network 110 configured to support communication between endpoint elements 102, and a controller 120 configured to control operation of packet switched network 110.

The endpoint elements 102 may include any elements which may be endpoints of communication via packet switched network 110 (which may or may not be the ultimate endpoints for which the transported data is intended). For example, endpoint elements 102 may include end user devices (e.g., computers, tablets, smartphones, or the like), network devices (e.g., gateway devices configured as gateways between packet switched network 110 and other networks or domains, access devices of other networks or domains with which packet switched network 110 interfaces, servers, or the like), network-hosted elements (e.g., virtual machines (VMs), virtual components, virtual component instances, or the like), or the like, as well as various combinations thereof.

The packet switched network 110 includes six nodes $111_1$-$111_6$ (collectively, nodes 111) which are interconnected via a set of communication links 115. The nodes 111 may be packet switches, packet forwarding elements, routers, or the like, as well as various combinations thereof. The nodes $111_1$, $111_3$, $111_5$, and $111_6$ are edge nodes. The nodes $111_2$ and $111_4$ are transit nodes. The nodes 111 each include one or more node interfaces 112, respectively. It is assumed that the node interfaces 112 of the nodes 111 are bidirectional node interfaces supporting outputting of packets or unidirectional node output interfaces supporting outputting of packets and, thus, node interfaces 112 of nodes 111 also may be referred to herein as node output interfaces 112 as various embodiments of packet forwarding based on path encoding are primarily concerned with operation of node interfaces 112 as output interfaces. It is noted that the bidirectional node interfaces may be managed by modeling each bidirectional node interface as a pair of two unidirectional node interfaces including a unidirectional node input interface and a unidirectional node output interface. It will be appreciated that one or more node interfaces 112 of one or more nodes 111 also may operate as node input interfaces, that one or more nodes 111 may include one or more unidirectional node input interfaces (omitted for purposes of clarity), or combinations thereof. The node interfaces 112 also may be referred to as network interfaces 112 as the node interfaces 112 may be configured to operate as interfaces to communication links 115 supporting network communications via the packet switched network 110. The communication links 115 are connected to node output interfaces 112 of nodes 111 in order to support communication between nodes 111 and, thus, between endpoint elements 102 via packet switched network 110. The node $111_1$ includes three node output interfaces 112 (illustratively, numbered 1-3) supporting communication paths between node $111_1$ and endpoint element $102_1$, node $111_4$, and node $111_2$, respectively. The node $111_2$ includes three node output interfaces 112 (illustratively, numbered 1-3) supporting communication paths between node $111_2$ and node $111_1$, node $111_5$, and node $111_3$, respectively. The node $111_3$ includes two node output interfaces 112 (illustratively, numbered 1-2) supporting communication paths between node $111_3$ and endpoint element $102_4$ and node $111_2$, respectively. The node $111_4$ includes three node output interfaces 112 (illustratively, numbered 1-3) supporting communication paths between node $111_4$ and node $111_1$, node $111_6$, and node $111_5$, respectively. The node $111_5$ includes three node output interfaces 112 (illustratively, numbered 1-3) supporting communication paths between node $111_5$ and node $111_4$, endpoint element $102_3$, and node $111_2$, respectively. The node $111_6$ includes two node output interfaces 112 (illustratively, numbered 1-2) supporting communication paths between node $111_6$ and node $111_4$ and endpoint element $102_2$, respectively. It will be appreciated that, although primarily depicted and described as having specific numbers and arrangements of nodes 111, node output interfaces 112, and communication links 115, packet switched network 110 may support various other numbers or arrangements of nodes 111, node output interfaces 112, and communication links 115. It will be appreciated that, although primarily depicted and described as having specific numbers and arrangements of endpoint elements 102, exemplary communication system 100 may support various other numbers or arrangements of endpoint element 102.

The controller 120 may be configured to control the operation of packet switched network 110. The controller 120 may be configured to support packet forwarding based on path encoding for supporting forwarding of packets within packet switched network 110.

The controller 120 may be configured to compute network paths for packet switched network 110. The controller 120 may compute network paths proactively, responsive to one or more conditions associated with packet switched network 110, responsive to requests from packet switched network 110 (e.g., responsive to requests from nodes 111 of packet switched network 110), or the like, as well as various combinations thereof. The controller 120 may compute network paths based on information which is the basis for the network paths (e.g., source addresses, destination addresses, source and destination address pairs, ingress and egress interface pairs, service information, or the like), network topology information, network status information, service information associated with the service or services to be supported, or the like, as well as various combinations thereof. The controller 120 may associate the network paths with the information which is the basis for the network paths (e.g., again, source addresses, destination addresses, source and destination address pairs, ingress and egress interface pairs, service information, or the like). The controller 120 may compute the network path as an ordered sequence of nodes 111 of the packet switched network 110. For example, in the case of a network path from endpoint element $102_1$ to endpoint element $102_3$, the ordered sequence of nodes 111 may be specified as follows: [node $111_1$, node $111_2$, node $111_5$]. The controller 120 may compute the network path as an ordered sequence of node output interfaces 112 of nodes 111 of the packet switched network 110. For example, in continuation of the above example of the network path from endpoint element $102_1$ to endpoint element $102_3$, the ordered sequence of node output interfaces 112 of nodes 111 may be specified as follows: [interface 3 of node $111_1$, interface 2 of node $111_2$, interface 2 of node $111_5$]. The controller 120 may compute the network path to include an ingress node interface 112 of the ingress node 111 into the packet switched network 110 for the network path, an egress node interface 112 of the egress node 111 out of the packet switched network 110 for the network path, or both. The inclusion of ingress node interface information and/or egress node interface information may be used for mapping of packets between the network paths within packet switched network 110 and elements or paths outside of packet switched network 110. For example, in continuation of the above example of the network path from endpoint element $102_1$ to endpoint element $102_3$, the ordered sequence of node interfaces 112 of nodes 111 may be specified as follows: [interface 1 of node $111_1$, interface 3 of node $111_1$, interface 2 of node $111_2$, interface 2 of node $111_5$, interface 2 of node $111_5$]. The controller 120 may, for each of the nodes 111, maintain network path mapping information for the node 111 and, optionally, may distribute the network path mapping information to the node 111. The network path mapping information for a node 111 may include, for each network path for which the node 111 is an ingress point into the packet switched network 110 and for each network path for which the node 111 is an egress point out of the packet switched network 110, a mapping of the information which is the basis for the network paths (e.g., again, source addresses, destination addresses, source and destination address pairs, ingress and egress interface pairs, service information, or the like) and information defining the network paths, respectively. For example, in continuation of the above example of the network path from endpoint element $102_1$ to endpoint element $102_3$, for network paths based on source/destination address pairs, controller 120 may maintain network path mapping information that includes a mapping of (1) a combination of a source address specifying an address of endpoint element $102_1$ and a destination address specifying an address of endpoint element $102_3$ to (2) the ordered sequence of node output interfaces 112 of nodes 111 (namely, [interface 1 of node $111_1$, interface 3 of node $111_1$, interface 2 of node $111_2$, interface 2 of node $111_5$, interface 2 of node $111_5$]). As discussed further below, the network path mapping information for the nodes 111 may be used in various ways (e.g., controller 120 may use the network path mapping information for the nodes 111 to compute path encoding labels for network paths and to establish associations between network paths and path encoding labels computed for the network paths, nodes 111 may use the network path mapping information that is received from controller 120 in order compute path encoding labels for network paths, or the like). Exemplary network path mapping information is depicted in FIG. 2A for the example of the network path from endpoint element $102_1$ to endpoint element $102_3$ as well as for other potential network paths of FIG. 1. In FIG. 2A, the network paths are determined based on a combination of source address and destination address and are described as an ordered sequence of node output interfaces 112 of nodes 111. As depicted in FIG. 2A, the network path mapping information 210 is represented as a table including SOURCE ADDRESS, DES- TINATION ADDRESS, and NETWORK PATH DESCRIPTION columns. The first row of the table indicates that, for a combination of a source address specifying endpoint element $102_1$ and a destination address specifying endpoint element $102_3$, the network path is [interface 3 of node $111_1$, interface 2 of node $111_2$, interface 2 of node $111_5$]. The second row of the table indicates that, for a combination of a source address specifying endpoint element $102_4$ and a destination address specifying endpoint element $102_2$, the network path is [interface 1 of node $111_3$, interface 2 of node $111_2$, interface 1 of node $111_5$, interface 2 of node $111_6$]. The network path mapping information 210 of FIG. 2A may include network path mapping information for other network paths, may be organized in other ways (e.g., different arrangements of the information within a table, using different types of data structures, or the like, as well as various combinations thereof), may define network paths in other ways, or the like, as well as various combinations thereof. Referring again to FIG. 1, it is noted that controller 120 may maintain network path information for network paths computed by controller 120 (illustratively, network path information 121) and that the controller 120 may handle network path information 121 (e.g., generate network path information 121, distribute network path information 121, use network path information 121, or the like) based on one or more network path control processes 122.

Figure 2B:

The controller 120 may be configured to compute node interface labels for node output interfaces 112 of nodes 111 of packet switched network 110. The controller 120 may compute node interface labels for node output interfaces 112 of a node 111 in a manner for ensuring that the set of node interface labels is prefix-free. The controller 120 may compute node interface labels for node output interfaces 112 of the nodes 111 of packet switched network 110 in a manner for ensuring that path encoding labels for network paths of packet switched network 110 are of a sufficient length for all of the network paths of the packet switched network 110 (e.g., such that even the longest path encoding label for the packet switched network 110 is able to be associated with packets to be transported via the associated network path (e.g., fits within the header(s) or header field(s) assigned for use in transporting the path encoding labels)). The controller 120 may compute node interface labels for node output interfaces 112 of the nodes 111 by assigning to each node output interface $112_i$ of each of the nodes 111 a respective length function $l_i$ and creating the node interface labels for the node output interfaces 112 of the nodes 111 with those lengths. The lengths are chosen such that, for the nodes 111, the sum of $2^{(-l_i)}$ over all node output interfaces 112 of the nodes 111 is at most equal to 1. In at least some embodiments, assignment of the length functions $l_i$ to the node output interfaces $112_i$ of the nodes may be performed by formulating the assignment problem as a convex optimization problem that can be solved efficiently (e.g., using an interior-point optimization algorithm or other similar algorithm or technique) and rounding the solution to satisfy integer constraints. The creation of the node interface labels for the node output interfaces 112 of the nodes 111 with those lengths (i.e., the lengths determined for the node output interfaces 112) may be performed using a process for computing prefix-free source codes. The condition imposed on the length functions $l_i$ guarantees that the process for computing prefix-free source codes will be able to find a solution with the required lengths. It will be appreciated that controller 120, in order to compute the node interface labels for node output interfaces 112 of the nodes 111 of packet switched network 110 in a manner for ensuring that path encoding labels for network paths of packet switched network 110 are of a sufficient length for all of the network paths of the packet switched network 110 (e.g., fits within the header(s) or header field(s) assigned for use in transporting the path encoding labels), may require information indicative of the network path lengths of network paths to be supported within packet switched network 110 (e.g., the longest network path length or all network path lengths), which may be pre-computed by controller 120, pre-computed by an element and provided to controller 120, or the like. The determination of such network path length information may be performed based on network topology information, network path information associated with network paths computed for packet switched network 110, or the like, as well as various combinations thereof. In at least some embodiments, the above-described process may be referred to as an optimal path encoding algorithm. The controller 120 may, for each of the nodes 111, maintain node interface label mapping information for the node 111 and distribute the node interface label mapping information to the node 111. The node interface label mapping information for a node 111 may include, for each node output interface 112 of the node 111, a mapping of a node interface identifier of the node output interface 112 to the node interface label assigned to the node output interface 112. For example, for node $111_1$, the node interface labels may include: [node interface label=0 for interface 1, node interface label=10 for interface 2, node interface label=11 for interface 3]. Similarly, for example, for node $111_2$, the node interface labels may include: [node interface label=1 for interface 1, node interface label=01 for interface 2, node interface label=00 for interface 3]. Similarly, for example, for node $111_3$, the node interface labels may include: [node interface label=0 for interface 1, node interface label=1 for interface 2]. Similarly, prefix-free node interface labels may be assigned for each of the other nodes 111 of packet switched network 110. As discussed further below, the node interface label mapping information for the nodes 111 may be used in various ways (e.g., controller 120 may use the node interface label mapping information for the nodes 111 to compute path interface labels for network paths, nodes 111 may use the node interface label mapping information that is received from controller 120 in order to forward packets (e.g., for decoding a portion of a path encoding label of a packet to determine the node output interface 112 of the node 111 via which the packet is to be forwarded), or the like). Exemplary node interface label mapping information is depicted in FIG. 2B for node $111_1$ of FIG. 1. As depicted in FIG. 2B, the node interface label mapping information 220 is represented as a table including INTERFACE IDENTIFIER and NODE INTERFACE LABEL columns. As depicted in FIG. 2B, interfaces 1, 2, and 3 of node $111_1$ have been assigned prefix-free node interface labels of 0, 10, and 11, respectively. The node interface label mapping information 220 of FIG. 2B may be organized in other ways (e.g., different arrangements of the information within a table, using different types of data structures, or the like, as well as various combinations thereof), may define node interface labels in other ways, or the like, as well as various combinations thereof. Referring again to FIG. 1, the controller 120 may maintain node interface label information (illustratively, node interface label information 123) for node interface labels computed by controller 120 and may handle the node interface label information 123 (e.g., generate node interface label information 123, distribute node interface label information 123, use node interface label information 123, or the like) based on one or more node interface label control processes 124.

Figure 2C:

The controller 120 may compute path encoding labels for network paths of packet switched network 110. The controller 120 may compute a path encoding label for a network path based on the network paths determined by the controller 120 and path encoding labels computed by the controller 120 for node output interfaces 112 of nodes 111 of packet switched network 110. For example, in continuation of the above example of the network path from endpoint element $102_1$ to endpoint element $102_3$ (having an ordered sequence of node output interfaces 112 of nodes 111 that includes [interface 3 of node $111_1$, interface 2 of node $111_2$, interface 2 of node $111_5$]), controller 120 may use node interface label mapping information for node $111_1$ to determine that the node interface label for interface 3 of node $111_1$ is 11, use node interface label mapping information for node $111_2$ to determine that the node interface label for interface 2 of node $111_2$ is 01, use node interface label mapping information for node $111_5$ to determine that the node interface label for interface 2 of node $111_5$ is 10, and concatenate the determined node interface labels to form a path encoding label of 110110 for the network path. The controller 120 may provide the path encoding labels for network paths of packet switched network 110 to some or all of the nodes 111 of packet switched network 110 (e.g., at least to the edge nodes 111 and, optionally, also to the transit nodes 111). The controller 120 may provide the path encoding labels for network paths of packet switched network 110 to nodes 111 periodically, responsive to a condition which triggers a change in one or more network paths, responsive to requests from nodes 111, or the like, as well as various combinations thereof. The controller 120 may provide path encoding labels to nodes 111 as standalone information (e.g., responsive to a request from a node 111 such that the association of the response message including the path encoding label to the request message sent by the node 111 will enable the node 111 to appropriately apply the path encoding label to the correct packet based on information with which the network path is associated) that is not part of a mapping, as mapping information including mappings of information which is the basis for selecting network paths (e.g., source addresses, destination addresses, source/destination address pairs, ingress/egress interface pairs, service information, or the like) to the path encoding labels to be used for the network paths, or the like, as well as various combinations thereof. The controller 120 may maintain path encoding label mapping information which may include, for each network path of packet switched network 110, a mapping of the information which is the basis for the network path (e.g., source addresses, destination addresses, source and destination address pairs, ingress and egress interface pairs, service information, or the like) and the path encoding label computed for the network path. For example, in continuation of the above example of the network path from endpoint element $102_1$ to endpoint element $102_3$, for network paths based on source/destination address pairs, controller 120 may maintain network path mapping information that includes a mapping of (1) a combination of a source address specifying an address of endpoint element $102_1$ and a destination address specifying an address of endpoint element $102_3$ to (2) the ordered sequence of node output interfaces 112 of nodes 111 (namely, [interface 1 of node $111_1$, interface 3 of node $111_1$, interface 2 of node $111_2$, interface 2 of node $111_5$, interface 2 of node $111_5$]). The controller 120 may maintain the path encoding label mapping information on a per-node basis. The controller 120 may, for each of the edge nodes 111, provide to the edge node 111 a portion of the path encoding label mapping information for network paths for which the edge node 111 is an ingress point into packet switched network 110 and for which edge node 111 is an egress point out of packet switched network 110. As discussed further below, the path encoding label mapping information for network paths of packet switched network 110 may be used in various ways (e.g., controller 120 may use the path encoding label mapping information for the nodes 111 to respond to path encoding label requests from nodes 111, edge nodes 111 may use the path encoding label mapping information that is received from controller 120 in order to associate path encoding labels with packets of network paths for forwarding of the packets via packet switched network 110, or the like). Exemplary path encoding label mapping information is depicted in FIG. 2C for the example of the network path from endpoint element $102_1$ to endpoint element $102_3$ as well as for other potential network paths of FIG. 1. In FIG. 2C, as in FIG. 2A, the network paths are determined based on a combination of source address and destination address. As depicted in FIG. 2C, the path encoding label mapping information 230 is represented as a table including SOURCE ADDRESS, DESTINATION ADDRESS, and PATH ENCODING LABEL columns. The first row of the table indicates that, for a combination of a source address specifying endpoint element $102_1$ and a destination address specifying endpoint element $102_3$, the path encoding label for the network path is 110110. The second row of the table indicates that, for a combination of a source address specifying endpoint element $102_4$ and a destination address specifying endpoint element $102_2$, the path encoding label for the network path is 001010. The path encoding label mapping information 230 of FIG. 2B may include path encoding label mapping information for other network paths, may be organized in other ways (e.g., different arrangements of the information within a table, using different types of data structures, or the like, as well as various combinations thereof), may define network paths or path encoding labels in other ways, or the like, as well as various combinations thereof. Referring again to FIG. 1, it is noted that controller 120 may maintain path encoding label information for path encoding labels computed by controller 120 (illustratively, path encoding label information 125) and that the controller 120 may handle path encoding label information 125 (e.g., generate path encoding label information 121, distribute path encoding label information 121, use path encoding label information 121, or the like) based on one or more path encoding label control processes 126.

The packet switched network 110, under control of controller 120, is configured to support packet forwarding based on path encoding to support forwarding of packets within packet switched network 110. The edge nodes 111 of packet switched network 110 may be configured to associate a path encoding label of a network path with an incoming packet that is to be forwarded via the network path. The transit nodes 111 of packet switched network 110 may be configured to perform forwarding of a packet based on a path encoding label associated with the packet. These and other functions which may be performed by nodes 111 of packet switched network 110 are discussed in additional detail below. It will be appreciated that at least some of the nodes 111 may function as both ingress edge nodes and egress edge nodes. It is noted that the technique of encoding network paths to form path encoding labels and associating the path encoding labels with packets to be transported via the respective network paths may be referred to as path encoding (PE). It is noted that, for a packet to be routed via a network path, the header or portion of header which stores the path encoding label for the network path may be referred to as a path encoding header or, more simply, path header. It is noted that a packet forwarding node which can understand, decode, and forward packets based on path headers (e.g., nodes 111) may be referred to as a path encoding switch. It is noted that a network including path encoding switches may be referred to as a path encoding network.

Figure 3A:
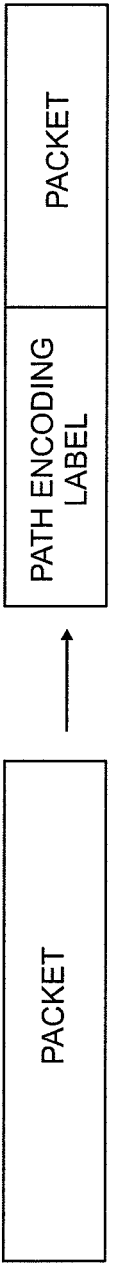
Figure 3B:
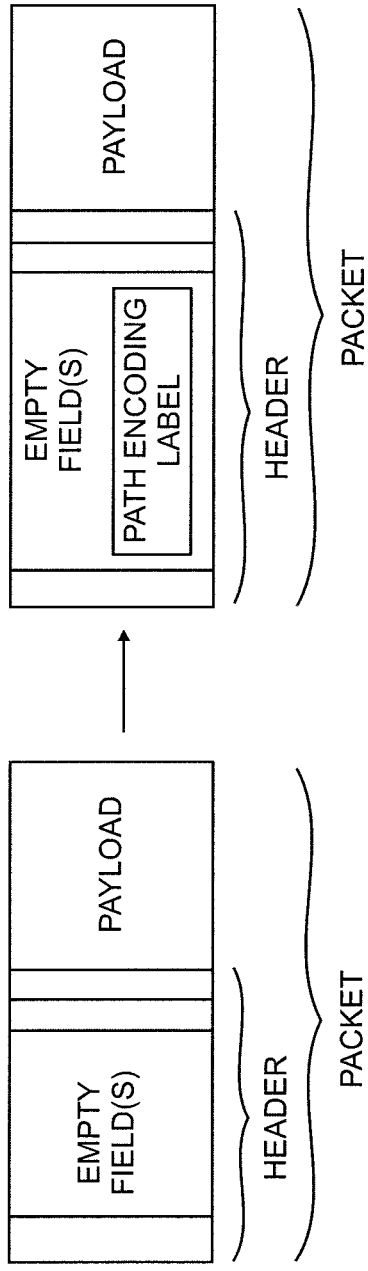
Figure 3C:
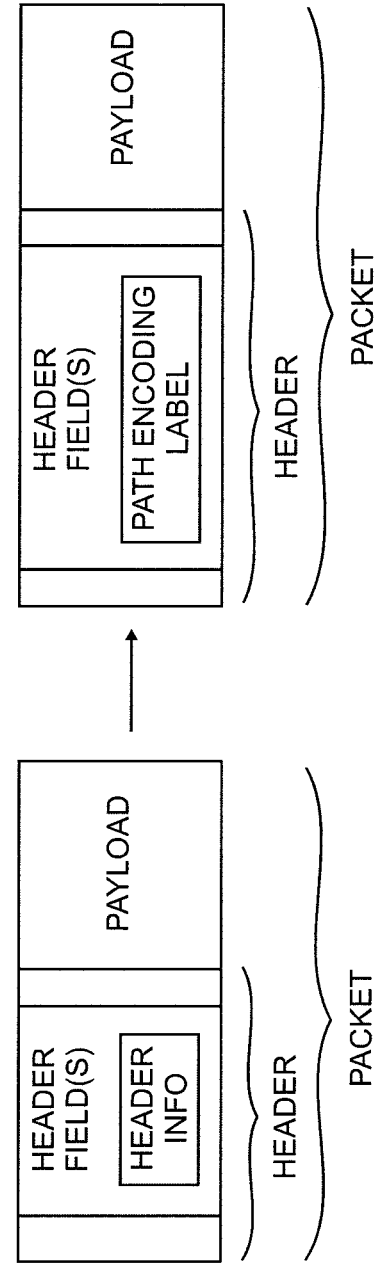

The ingress edge nodes 111 of the packet switched network 110 may be configured to associate a path encoding label of a network path with an incoming packet that is to be forwarded via the network path. An ingress edge node 111 may receive a packet, determine a network path via which the received packet is to be routed, associate a path encoding label for the network path with the received packet, and forward the received packet based on the path encoding label for the network path that has been associated with the received packet. The ingress edge node 111 may determine the network path via which the received packet is to be routed based on information which is the basis for packet forwarding (e.g., source address, destination address, source and destination address pair, ingress and egress interface pair, service information, or the like), which may be determined from the received packet (e.g., from a header of the received packet), based on the manner in which the packet is received (e.g., an ingress interface via which the packet is received), or the like, as well as various combinations thereof. The ingress edge node 111 may obtain the path encoding label for the network path locally (e.g., based on path encoding label mapping information received from controller 120, which includes a mapping of the network path to the path encoding label for the network path), from controller 120 (e.g., via a message requesting retrieval of the path encoding label for the network path such that the controller 120 may reply with the path encoding label for the network path based on identification of the network path in the message requesting retrieval of the path encoding label for the network path), or the like. An ingress edge node 111 may associate the path encoding label for the network path with the received packet in a number of ways, at least some of which are depicted in FIGS. 3A-3E. In at least some embodiments, as depicted in FIG. 3A, association of the path encoding label with the packet may include adding to the packet an additional header including the path encoding label. In at least some embodiments, as depicted in FIG. 3B, association of the path encoding label with the packet may include inserting the path encoding label into one or more unused header fields of the existing header of the packet. In at least some embodiments, as depicted in FIG. 3C, association of the path encoding label with the packet may include replacing at least a portion of the contents of one or more header fields of the existing header of the packet with the path encoding label. The one or more header fields of the existing header of the packet may include the source address field, the destination address field, a combination of the source and destination address fields, or any other suitable header fields. For an IP packet, as depicted in FIG. 3D for example, the source and destination address fields each include 32 bits, such that use of a combination of the source and destination address fields provides a total of 64 bits for use in transporting the path encoding label. For an Ethernet packet, as depicted in FIG. 3E for example, the destination and source address fields each include 48 bits (however, the first and second bits of the destination address field are a unicast/multicast bit and an IEEE/private indicator bit, respectively), such that use of a combination of the destination and source address fields provides a total of 94 bits for use in transporting the path encoding label (the destination address field includes the same two bits, but these may be overwritten for use in transporting the path encoding label). As indicated above, the header or portion of header which stores the path encoding label for the network path also may be referred to as a path encoding header or, more simply, path header. Referring again to FIG. 1, the packet may be forwarded over the network path based on the path encoding label associated with the packet by the ingress edge node 111. The functions performed by an ingress edge node 111 for associating a path encoding label of a network path with an incoming packet that is to be forwarded via the network path may be performed by the ingress node interface 112 via which the packet is received by the ingress edge node 111 (e.g., in continuation of the above example of the network path from endpoint element $102_1$ to endpoint element $102_3$, interface 1 of node $111_1$), may be performed by a different element or portion of the ingress edge node 111, may be distributed across different elements or portions of the ingress edge node 111, or the like.

The nodes 111 (including ingress edge nodes, transit nodes, and egress edge nodes) of the packet switched network 110 may be configured to forward a packet based on a path encoding label associated with the packet. As discussed above, the path encoding label is composed of an ordered sequence of node interface labels for the node output interfaces 112 of nodes 111 of the network path. As a result, respective portions of the path encoding label associated with the packet are intended for use by respective nodes 111 in the ordered sequence of nodes 111 of the network path and, thus, the nodes 111 of the network path are configured to be able to identify the portion of the path encoding label associated with the nodes 111 and which are to be used by the nodes 111 to forward the packet, respectively. A node 111 may determine forwarding of a packet based on a path encoding label associated with the packet in a number of ways, at least some of which are depicted in FIGS. 4A-4B.

Figures 4A, 4B:
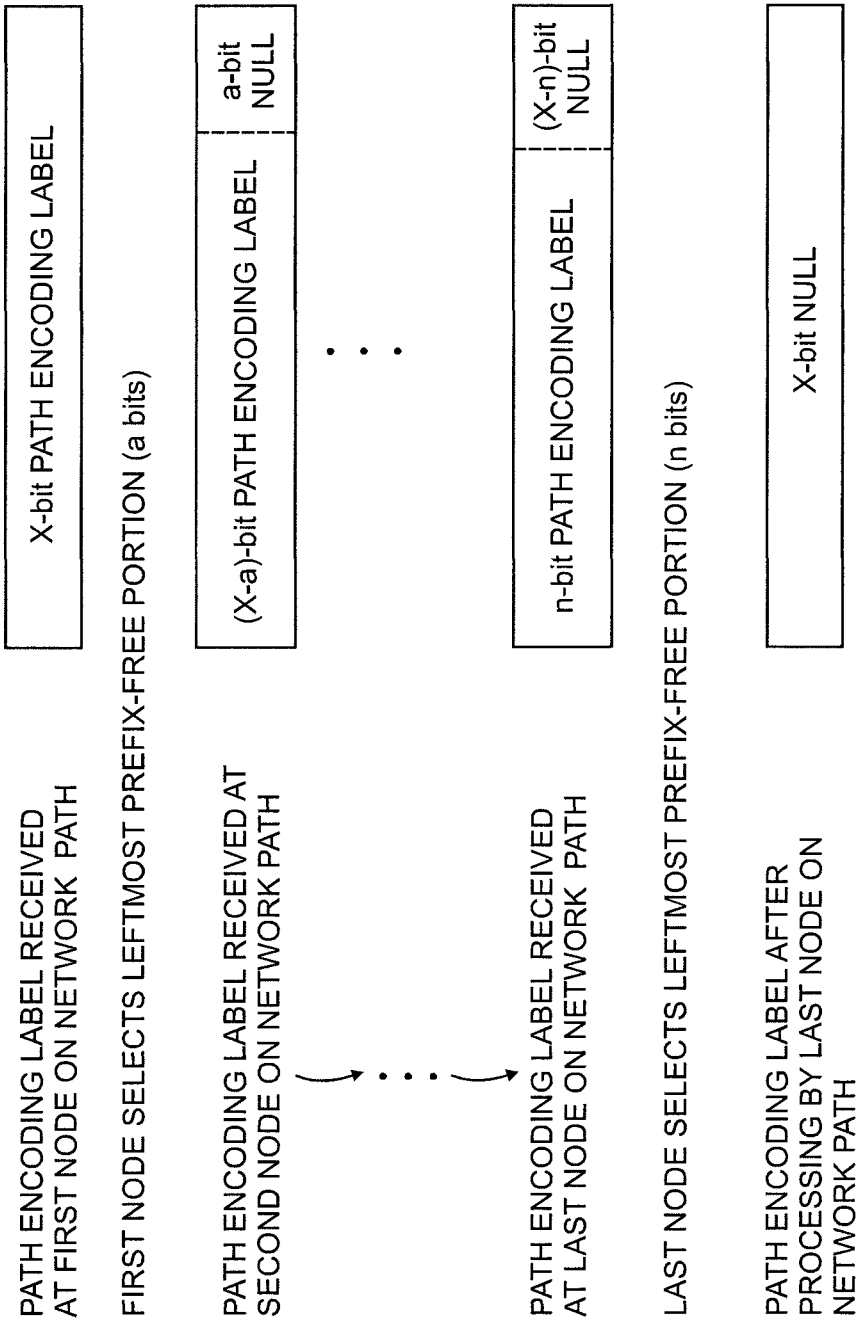
FIGS. 4A-4B depict mechanisms for forwarding a packet based on a path encoding label at node of a communication system configured to support packet forwarding based on path encoding.

In at least some embodiments, as depicted in FIG. 4A, a portion of the path encoding label is configured to include offset information which may be used by nodes 111 along the network path to identify portions of the path encoding label that are intended for use by respective nodes 111 in the ordered sequence of nodes 111 of the network path in determining forwarding of the packet. Here, the path encoding label may be composed of the offset information and a network path label which is the ordered sequence of node interface labels of node output interfaces 112 of the network path (i.e., in the absence of offset information, the network path label which is the ordered sequence of node interface labels of node output interfaces 112 of the network path also may be referred to herein as the path encoding label). In at least some embodiments, in order to determine routing of a packet having a path encoding label associated therewith, a node 111 identifies a portion of the path encoding label that includes offset information, identifies a portion of the path encoding label intended for the node 111 based on the offset information, and forwards the packet based on the portion of the path encoding label intended for the node 111. The offset information may identify the bit position or positions of the path encoding label including the bit(s) of the path encoding label intended for use by the node 111 in forwarding the packet (namely, the node 111 does not require knowledge of prefix-free bit sequences in order to identify the full portion of the path encoding label intended for use by the node 111 in forwarding the packet). The offset information may identify a bit position of the path encoding label that includes a first bit of the portion of the path encoding label intended for use by the node 111 in forwarding the packet, and the node 111 may then identify the full portion of the path encoding label intended for use by the node 111 in forwarding the packet based on knowledge of prefix-free bit sequences (e.g., by selecting the longest prefix-free bit string beginning at the first bit that is indicated by the offset information). The offset information may encode the bit position information for all of the nodes 111 along the network path. The offset information may encode the bit position information for one of the nodes 111 of the network path at a time while being updated at each node 111 along the network path (discussed further in the example below). It is noted that various combinations of such offset information may be used. The node 111 may forward the packet based on the portion of the path encoding label intended for the node 111 by using the portion of the path encoding label intended for the node 111 to determine the node output interface 112 of the node 111 via which to forward the packet. The node 111 may determine the node output interface 112 of the node 111 via which to forward the packet by using the portion of the path encoding label intended for the node 111 as a key into node interface label mapping information maintained by the node 111 to determine an associated identifier of the node output interface 112 of the node 111 via which to forward the packet. In continuation of the above example of the network path from endpoint element $102_1$ to endpoint element $102_3$, assume that the path encoding label for the network path at the ingress node $111_1$ is 0101110110, where the first four bits (0101) are offset information and the last six bits (110110) are the network path label as discussed above for this example. In this example, node $111_1$ may use the offset information 0101 in order to determine that the portion of the network path label of the path encoding label that is intended for node $111_1$ begins at the fifth bit of the path encoding label (which is the first bit of the network path label of the path encoding label), use knowledge of prefix-free labels to determine that the portion of the network path label of the path encoding label that is intended for node $111_1$ includes the first and second bits of the network path label portion of the path encoding label (namely, 11), perform a lookup to determine that the node interface label "11" corresponds to interface 3 of node $111_1$, update the offset information of the path encoding label based on the determination that the portion of the network path label of the path encoding label that is intended for node $111_1$ includes the first and second bits of the network path label portion of the path encoding label (e.g., by changing the offset information from 0101 to 0111 to indicate that the portion of the path encoding label that is intended for the next node 111 of the network path begins at the seventh bit of the path encoding label (which is the third bit of the network path label of the path encoding label), such that the path encoding label of the packet changes from 0101110110 to 0111110110), and propagate the packet via interface 3 for delivery to node $111_2$. Similarly, in this example, node $111_2$ may use the offset information 0111 in order to determine that the portion of the network path label of the path encoding label that is intended for node $111_2$ begins at the seventh bit of the path encoding label (which is the third bit of the network path label of the path encoding label), use knowledge of prefix-free labels to determine that the portion of the network path label of the path encoding label that is intended for node $111_2$ includes the third and fourth bits of the network path label portion of the path encoding label (namely, 01), perform a lookup to determine that the node interface label "01" corresponds to interface 2 of node $111_2$, update the offset information of the path encoding label based on the determination that the portion of the network path label of the path encoding label that is intended for node $111_2$ includes the third and fourth bits of the network path label portion of the path encoding label (e.g., by changing the offset information from 0111 to 1001 to indicate that the portion of the path encoding label that is intended for the next node 111 of the network path begins at the ninth bit of the path encoding label (which is the fifth bit of the network path label of the path encoding label), such that the path encoding label of the packet changes from 0111110110 to 1001110110), and propagate the packet via interface 2 for delivery to node $111_5$. Similarly, in this example, node $111_5$ may use the offset information 1001 in order to determine that the portion of the network path label of the path encoding label that is intended for node $111_5$ begins at the ninth bit of the path encoding label (which is the fifth bit of the network path label of the path encoding label), use knowledge of prefix-free labels to determine that the portion of the network path label of the path encoding label that is intended for node $111_5$ includes the fifth and sixth bits of the network path label portion of the path encoding label (namely, 10), perform a lookup to determine that the node interface label "10" corresponds to interface 2 of node $111_5$, update the offset information of the path encoding label based on the determination that the portion of the network path label of the path encoding label that is intended for node $111_2$ includes the fifth and sixth bits of the network path label portion of the path encoding label (or omit such an update since node $111_5$ is the last hop of the network path)), and propagate the packet via interface 2 for delivery to endpoint element $102_3$.

In at least some embodiments, as depicted in FIG. 4B, the path encoding label does not include offset information which may be used by nodes 111 along the network path to identify portions of the path encoding label that are intended for use by respective nodes 111 in determining forwarding of the packet; rather, the path encoding label is manipulated by the nodes 111 along the network path such that, upon receipt of the packet by a given node 111 of the network path, the leftmost, prefix-free portion of the path encoding label of the received packet includes the portion of the path encoding label intended for use by the given node 111 in forwarding the packet. As a result, a given node 111 of the network path, after receiving the packet, uses the leftmost prefix-free portion of the path encoding label of the packet to determine forwarding of the packet at the given node 111, modifies the packet by removing the leftmost prefix-free portion of the path encoding label that was used by the given node 111 and left-shifting any remaining portion of the path encoding label (such that an adjacent, downstream node 111 on the network path may use the leftmost, prefix-free portion of the path encoding label to determine forwarding of the packet), and forwarding the packet (including the modified path encoding label) based on the determined forwarding of the packet. The node 111 may forward the packet based on the portion of the path encoding label intended for the node 111 by using the portion of the path encoding label intended for the node 111 to determine the node output interface 112 of the node 111 via which to forward the packet. The node 111 may determine the node output interface 112 of the node 111 via which to forward the packet by using the portion of the path encoding label intended for the node 111 as a key into node interface label mapping information maintained by the node 111 to determine an associated identifier of the node output interface 112 of the node 111 via which to forward the packet. In continuation of the above example of the network path from endpoint element $102_1$ to endpoint element $102_3$, assume that the path encoding label for the network path is 110110. In this example, node $111_1$ may determine that the leftmost prefix-free portion of the path encoding label of the packet corresponds to the two leading bits (namely, 11) of the path encoding label 110110, perform a lookup to determine that the node interface label "11" corresponds to interface 3 of node $111_1$, remove the two leading bits of the path encoding label and left-shift the remaining four bits of the path encoding label, and propagate the packet via interface 3 for delivery to node $111_2$. Similarly, in this example, node $111_2$ may determine that the leftmost prefix-free portion of the path encoding label of the packet corresponds to the two leading bits (namely, 01) of the path encoding label 0110, perform a lookup to determine that the node interface label "01" corresponds to interface 2 of node $111_2$, remove the two leading bits of the path encoding label and left-shift the remaining two bits of the path encoding label, and propagate the packet via interface 2 for delivery to node $111_5$. Similarly, in this example, node $111_5$ may determine that the leftmost prefix-free portion of the path encoding label of the packet corresponds to the two remaining bits (namely, 10) of the path encoding label 10, perform a lookup to determine that the node interface label "10" corresponds to interface 2 of node $111_5$, remove the two remaining bits of the path encoding label, and propagate the packet via interface 2 for delivery to endpoint element $102_3$. It is noted that, while such embodiments support a great number of bits for encoding of node interface labels of the network path than where the path encoding label uses bits to encode offset information, it results in discarding of network path information along the network path (which may be problematic where there are errors at any hop along the network path, where such information is needed at the destination side of the network tunnel, or the like). It is noted that, in at least some embodiments, removal of portions of the encoded path label at hops along the network path may require or use tunneling along the network path (e.g., encapsulating the packet at or near the ingress point to the network path and detunneling the packet at or near the egress point from the network path).

It will be appreciated that there may be various tradeoffs in the different ways in which the path encoding label may be configured and used for forwarding of packets, such as tradeoffs in whether or not to use offset information as part of the path encoding label (e.g., based on the number of bits available for transporting the path encoding label which may vary for different packet types, based on length of the longest network path to be encoded, or the like), tradeoffs in the number of bits available for specifying the network path and the number of bits available for specifying offset information (e.g., based on the number of bits available for transporting the path encoding label which may vary for different packet types, based on the length of the longest network path to be encoded, or the like), or the like, as well as various combinations thereof.

The egress edge nodes 111 of the packet switched network 110 may be configured to disassociate a path encoding label of a network path from a packet forwarded via the network path. An egress edge node 111 may, as described above, receive a packet including a path encoding label or at least some path encoding information and forward the received packet based on the path encoding label for the network path that was been associated with the received packet. The egress edge node 111 also may disassociate the path encoding label from the packet, which may depend on the manner in which the path encoding label was associated with the packet by the ingress edge node 111 of the network path. In at least some embodiments, for example, where the path encoding label was transported within a header added to the packet, the egress edge node may strip the header field before forwarding the packet via its node output interface 112. In at least some embodiments, for example, where the path encoding label was transported within one or more existing unused header fields of the packet, the egress edge node may remove the path encoding label from the packet before forwarding the packet via its node output interface 112. In at least some embodiments, for example, where the path encoding label was transported within one or more existing occupied header fields of the packet, the egress edge node may remove the path encoding label from the packet (and, optionally, replace the contents of the one or more existing occupied header fields of the packet) before forwarding the packet via its node output interface 112. For example, where the path encoding label was transported within the source and destination address fields of the packet, the egress node 111 may use the path encoding label to perform a lookup to retrieve the source and destination addresses associated with the network path, remove the path encoding label from the source and destination address fields of the packet, and insert the source and destination addresses of the packet in the source and destination address fields of the packet before forwarding the packet via its node output interface 112. The functions performed by an egress edge node 111 for disassociating a path encoding label of a network path from a packet forwarded via the network path may be performed by the egress node interface 112 via which the packet is to be forwarded by the egress edge node 111 (e.g., in continuation of the above example of the network path from endpoint element $102_1$ to endpoint element $102_3$, interface 2 of node $111_5$), may be performed by a different element or portion of the egress edge node 111, may be distributed across different elements or portions of the egress edge node 111, or the like.

It will be appreciated that, although primarily depicted and described herein with respect to embodiments in which controller 120 is configured to perform specific functions and nodes 111 are configured to perform specific functions, the various functions depicted and described herein may be distributed in other ways. For example, various functions depicted and described herein as being supported by controller 120 may be supported by nodes 111. For example, various functions depicted and described herein as being supported by nodes 111 may be supported by controller 120 (e.g., a node 111 may forward a packet to controller 120 which may then associate the path encoding label with the packet and forward the packet).

Figure 5:
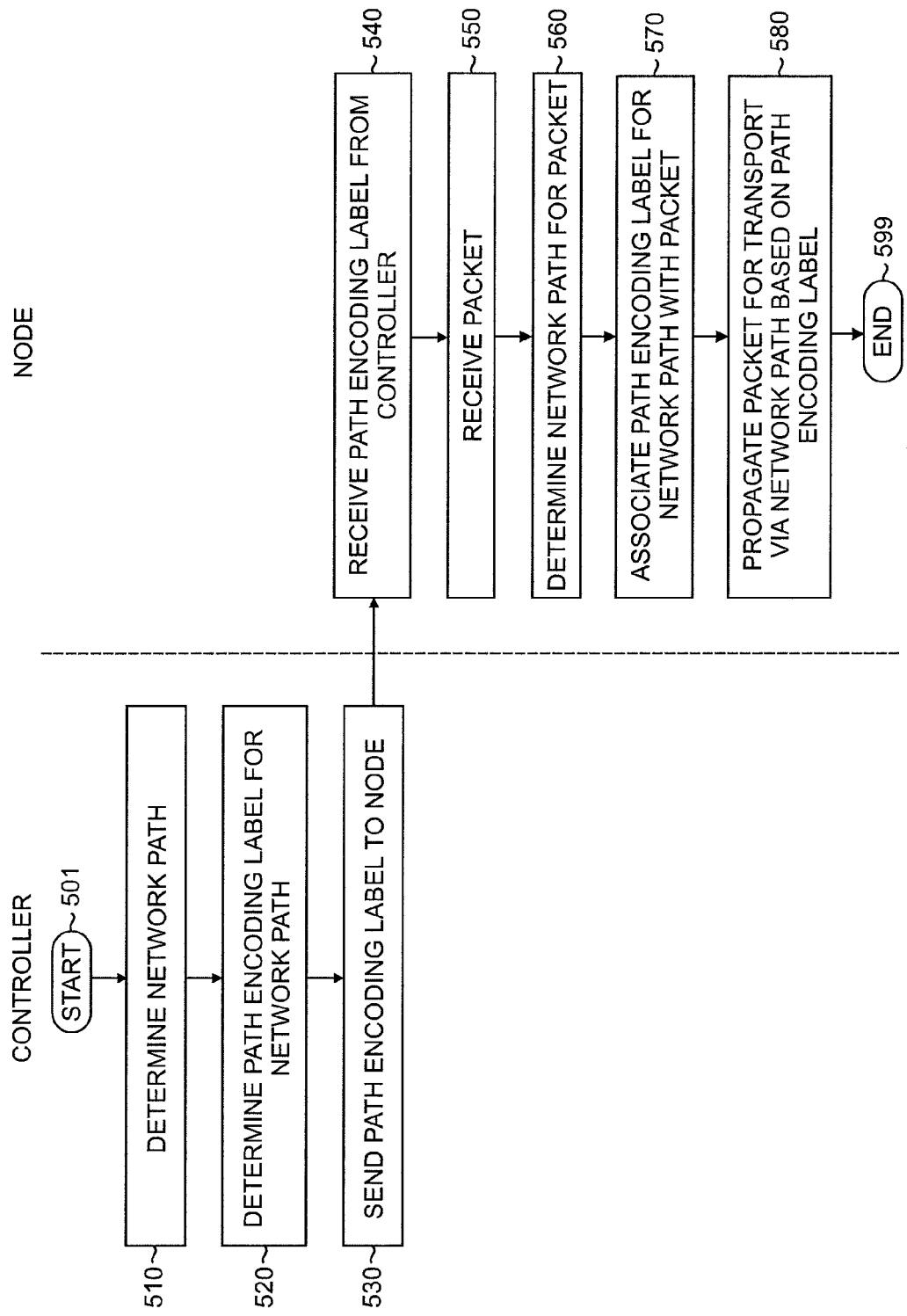
FIG. 5 depicts an exemplary embodiment of a method for supporting packet forwarding based on path encoding.

FIG. 5 depicts an exemplary embodiment of a method for supporting packet forwarding based on path encoding. It will be appreciated that, although primarily presented as being performed serially, at least a portion of the steps of method 500 may be performed contemporaneously or in a different order than as presented in FIG. 5. As depicted in FIG. 5, a portion of the steps of method 500 are performed by a controller (e.g., controller 120 of FIG. 1) and a portion of the steps are performed by a node (e.g., a node 111 of FIG. 1 that is an ingress point into network). At step 501, method 500 begins. At step 510, the controller determines a network path. At step 520, the controller determines a path encoding label for the network path. At step 530, the controller propagates the path encoding label for the network path toward the node. At step 540, the node receives the path encoding label for the network path. At step 550, the node receives a packet. At step 560, the node determines a network path for the packet. At step 570, the node associates the path encoding label for the network path with the packet. At step 580, the node propagates the packet for transport via the network path based on the path encoding label. At step 599, method 500 ends.

As described herein, the exemplary communication system 100 of FIG. 1, which is configured to support packet forwarding based on path encoding, may be implemented in various types of environments, networks, contexts, and so forth. Various embodiments of the capability for supporting packet forwarding based on path encoding are particularly well-suited for use in SDN-based networks. Accordingly, an exemplary implementation of the exemplary communication system 100 of FIG. 1 as an SDN network is depicted and described with respect to FIG. 6.

Figure 6:
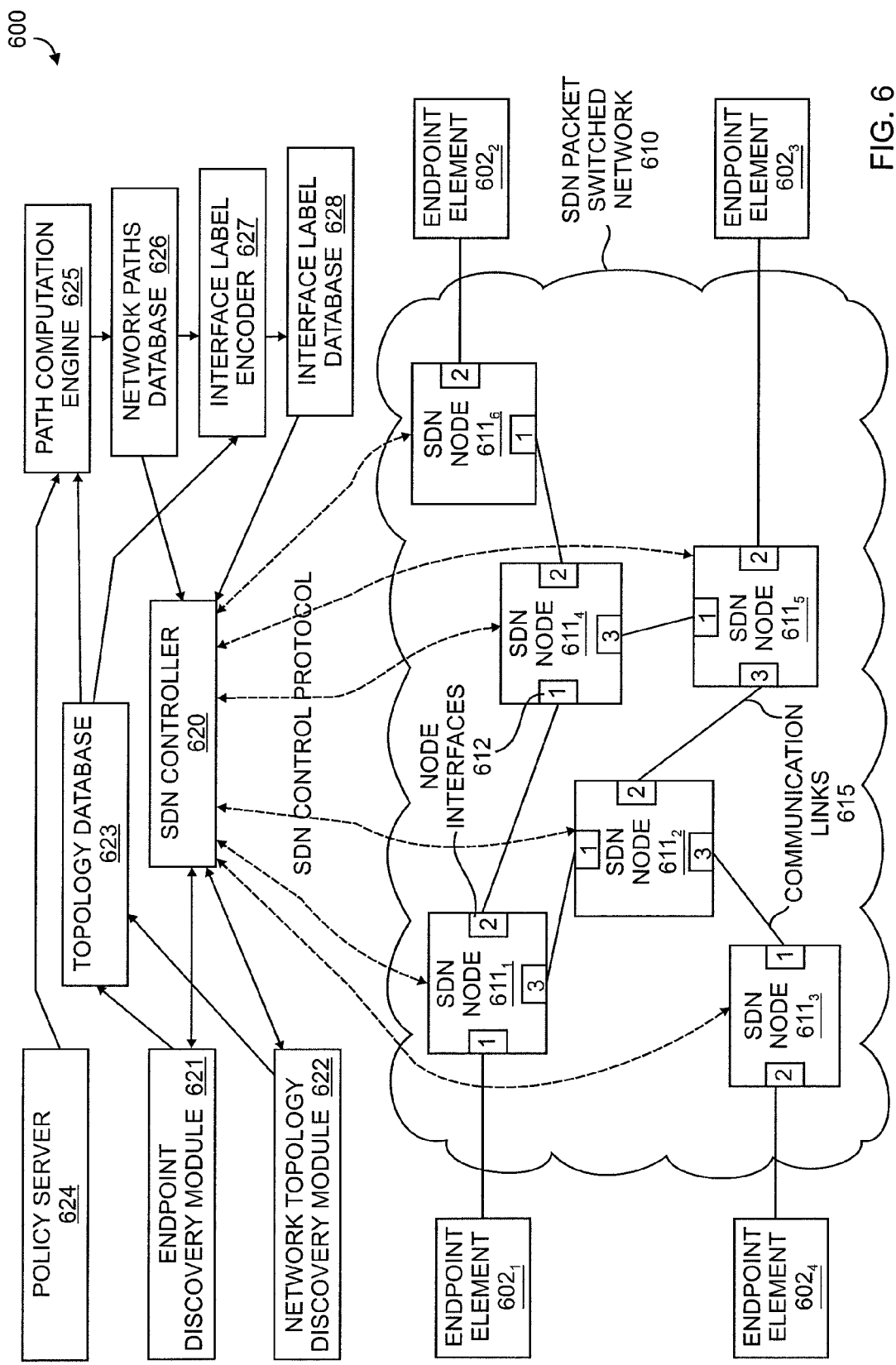
FIG. 6 depicts an exemplary SDN-based communication system configured to support packet forwarding based on path encoding.

FIG. 6 depicts an exemplary SDN-based communication system configured to support packet forwarding based on path encoding. The exemplary SDN-based communication system 600 of FIG. 6 is similar to the exemplary communication system 100 of FIG. 1 in that it includes four endpoint elements $602_1$-$602_4$ (collectively, endpoint elements 602), an SDN packet switched network 610 configured to support communication between endpoint elements 602, and an SDN controller 620 configured to control operation of SDN packet switched network 610. The SDN packet switched network 610 includes SDN nodes $611_1$-$611_6$ (collectively, SDN nodes 611), including associated node interfaces 612, where the interconnection of the SDN nodes 611 (via communication links 615) of FIG. 6 is identical to the interconnection of the nodes 111 (via communication links 115) of FIG. 1. The exemplary SDN-based communication system 600 of FIG. 6 also includes various other elements configured to perform various functions presented with respect to FIG. 1. The SDN-based communication system 600 of FIG. 6 is primarily depicted and described within the context of an Ethernet-based datacenter environment in which association of path encoding labels with packets is performed by replacement of the Ethernet source and destination addresses with the path encoding label, but may be used within various other types of environments. The SDN-based communication system 600 supports an SDN control protocol (e.g., OpenFlow or the like) by which SDN controller 120 may control SDN nodes 611. It is assumed that the edge SDN nodes 611 form the trust boundary of the domain within which forwarding of packets based on path encoding is supported, such that Ethernet endpoints outside of the trust boundary only see the regular, native Ethernet addresses of each other and it is only on entering the trust boundary that the native Ethernet source/destination addresses are transformed into the PAs and upon existing the trust boundary that the PAs are transformed back into the native Ethernet source/destination addresses. The translations between native Ethernet addresses and PAs may be implemented by having the SDN controller 620 program flow tables of the edge SDN nodes 611 to support such translations. As discussed above, SDN-based communication system 600 includes various other elements configured to cooperate, directly or indirectly, with SDN controller 120 to support forwarding of packets based on path encoding. The SDN-based communication system 600 includes an Endpoint Discovery Module 621 configured to discover endpoint elements 602, obtain and maintain information associated with endpoint elements 602 (e.g., endpoint element identifiers, endpoint element addresses, endpoint element location information, or the like), or the like, as well as various combinations thereof. The SDN-based communication system 600 includes a Network Topology Discovery Module 622 configured to perform network topology discovery functions (e.g., discovering SDN nodes 611, configurations of SDN nodes 611, information describing interconnections between SDN nodes 611, or the like, as well as various combinations thereof. The SDN-based communication system 600 includes a Topology Database 623 configured to maintain network topology information for the SDN packet switched network 610. The Topology Database 623 is populated by the Endpoint Discovery Module 621 and the Network Topology Discovery Module 622. The Topology Database 623 maintains network topology information and endpoint information such that SDN controller 620 has access to the network topology information and endpoint information for use in determining path encoding labels for network paths and performing other functions. The SDN-based communication system 600 includes a Policy Server 624 storing policies related to network paths which may be supported within SDN packet switched network 610 (e.g., flow-specific policies, user-specific policies, application-specific policies, policies related to middlebox traversals, policies related to service chaining, or the like, as well as various combinations thereof). The SDN-based communication system 600 includes a Path Computation Engine 625 that is configured to compute network paths based on topology information available from Topology Database 623 and policy information available from Policy Server 624. The Path Computation Engine 625 may compute direct network paths (e.g., for each source and destination pair in the network), service chaining network paths (e.g., based on the subscribed services of each endpoint element 602), or the like, as well as various combinations thereof. It is noted that the network paths may be represented as ordered sets or sequences of node interface identifiers of node interfaces 612 of SDN nodes 611, and may serve to uniquely identify Ethernet source and destination pairs as well as the paths between them. It is further noted that, since the network paths are unidirectional, the forward and reverse network paths through the SDN packet switched network 610 are not required to be symmetric. The SDN-based communication system 600 includes a Network Paths Database 626 configured to maintain the network paths generated by the Path Computation Engine 625. The SDN-based communication system 600 includes an Interface Label Encoder 627 configured to efficiently encode the node interface identifiers for node interfaces 612 of the SDN nodes 611 of SDN packet switched network 610 into node interface labels. The Interface Label Encoder 627 may be configured to efficiently encode the node interface identifiers into the node interface labels, where the node interface labels are variable length bit strings and are prefix free for unique decodability, in a manner for ensuring that the encoding of even the longest path of the SDN packet switched network 610 will fit within the Ethernet address fields of Ethernet packets. The SDN-based communication system 600 includes an Interface Label Database 628 which maintains, for each SDN node 611 of the SDN packet switched network 610, mappings associating each node interface 612 of the SDN node 611 to the node interface label for that node interface 612 of the SDN node 611. The SDN controller 620 is configured to use the Network Paths Database 626 and the Interface Label Database 628 in order to determine path encoding labels for network paths. The SDN controller 620 is configured to use the Network Paths Database 626 and the Interface Label Database 628 to populate flow tables at each of the edge SDN nodes 611 of SDN packet switched network 620 with a NAT mappings between source and destination address pairs and the corresponding encoded path label (also referred to as the PA for the network path). The SDN controller 620 is configured to use the Interface Label Database 628 to populate each SDN node 611 of SDN packet switched network 620 with its associated node interface label mapping information. It is noted that the node interface label mapping information for a given SDN node 611 is considered to be part of the configuration of the given SDN node 611 that is installed on the SDN node 611 using an SDN configuration protocol (e.g., OpenFlow-Config or the like) rather than an SDN control plane programming protocol (e.g., OpenFlow of the like).

Figure 7:
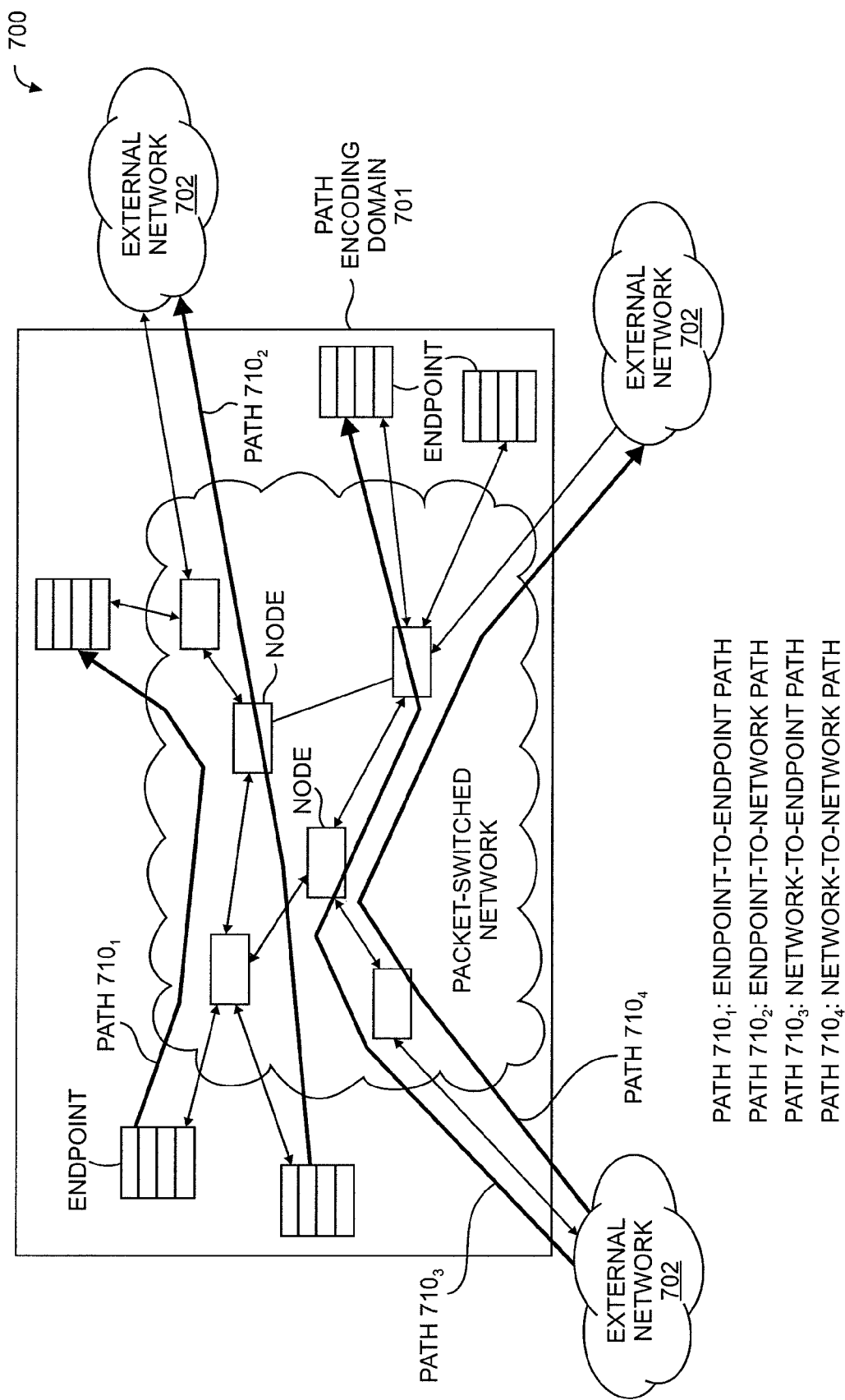
FIG. 7 depicts an exemplary communication system illustrating different network path types which may utilize packet forwarding based on path encoding.

It will be appreciated that, although primarily presented with respect to specific types of packet flows (based on locations of endpoint elements of the packet flows), forwarding of packets based on path encoding may be used to support various types of packet flows where the types of packet flows may be distinguished based on the locations of the source and destination of the packet flows (where location may be defined based on whether the location is within or outside of the network supporting forwarding of packets based on path encoding). The four cases are depicted in FIG. 7, which depicts an exemplary communication system illustrating different network path types which may utilize packet forwarding based on path encoding. As depicted in FIG. 7, exemplary communication system 700 includes a path encoding domain 701 and a set of external networks 702. The path encoding domain 701 supports forwarding of packets based on path encoding. The external networks 702 are external to the path encoding domain 701 and do not support forwarding of packets based on path encoding. The path encoding domain 701 includes nodes (similar to the nodes 111 of FIG. 1 and the nodes 611 of FIG. 6) as well as endpoint elements (which, unlike the exemplary communication system 100 of FIG. 1 and the exemplary communication system 600 of FIG. 6, are located within the path encoding domain 701). The exemplary communication system 700 supports four types of paths $710_1$-$710_4$ (collectively, paths 710). In cases in which both the source and destination of the packet flow are located within the path encoding domain 701 (e.g., endpoint-to-endpoint path $710_1$), the network path within the path encoding domain 701 uniquely identifies the source and destination address pair and, thus, the existing packet source and destination address header fields may be replaced with the path encoding label (where this may be referred to as NAT-based PA, as opposed to tunnel-based PA). In cases in which both the source and destination of the packet flow are located outside of the path encoding domain 701 (e.g., network-to-network path $710_4$), the network path does not uniquely identify the source and destination address pair and, thus, a header including the path encoding label may be added to the existing packet (where this may be referred to as tunnel-based PA, as opposed to NAT-based PA). In cases in which one of the endpoints is located within the path encoding domain 701 and one of the endpoints is located outside of the path encoding domain 701 (e.g., endpoint-to-network path $710_2$ or network-to-endpoint path $710_3$), it is possible to specify the path to the endpoint that is located within the path encoding domain 701 and, thus, encoding of path information within the packet may be a hybrid encoding in which path encoding label is inserted within the destination address field while the source address field is used to preserve the identity of the endpoint that is external to the path encoding domain 701. The use of hybrid encoding, while providing an advantage of being able to NAT the address of the packet while the packet is traversing the path encoding domain 701 (thereby preserving the MTU of the packet), results in a reduced number of bits available to transport the path encoding label. As a result, when the path encoding label is larger than destination address field of the packet (which will depend on the length of the network path and the size of the destination address field), the path encoding label will need to be added to the packet as a header rather than being added within the destination address field of the packet (i.e., tunnel mode, rather than hybrid mode, will need to be used in order to accommodate the longer path encoding label).

It will be appreciated that, although primarily presented with respect to embodiments in which all of the node interfaces of all of the nodes of the network are bidirectional (and, thus, may operate as node output interfaces), forwarding of packets based on path encoding labels may be provided in networks in which one or more of the node interfaces of one or more of the nodes are not configured to operate as node output interfaces. In such embodiments, the one or more node interfaces configured to operate only as node input interfaces may or may not have node interface labels assigned thereto (e.g., all of the node input interfaces may have node interface labels assigned thereto by including such node input interfaces for within the context of node interface label computation, only those node input interfaces configured as ingress points into the network may have node interface labels assigned thereto by including such node input interfaces for within the context of node interface label computation, or none of the node input interfaces may have node interface labels assigned thereto).

It will be appreciated that, although primarily presented with respect to embodiments in which all of the nodes of the network support forwarding of packets based on path encoding labels, forwarding of packets based on path encoding labels may be provided in networks in which not all of the nodes support forwarding of packets based on path encoding labels (which also may be referred to herein as a coexistence mode in which a network may include conventional nodes that do not support forwarding of packets based on path encoding labels and nodes that do support forwarding of packets based on path encoding labels). This may be due to phased introduction of support for forwarding of packets based on path encoding labels, characteristics of networks in which forwarding of packets based on path encoding labels may be deployed, or the like, as well as various combinations thereof. In at least some embodiments, coexistence may be supported within a network by enabling switches that support forwarding of packets based on path encoding labels to form "islands" within the network where use of path encoding labels for forwarding of packets is only supported within the islands and is not used outside of the islands. In at least some embodiments, nodes that support forwarding of packets based on path encoding labels may form tunnels across nodes that do not support forwarding of packets based on path encoding labels, which results in an end-to-end network topology supporting forwarding of packets based on path encoding labels but at the expense of use of tunnel headers to support the tunneling (which impacts the MTU of the packets and eliminates the possibility of using arbitrary paths across regions of the network that do not support forwarding of packets based on path encoding labels).

It will be appreciated that, although primarily depicted and described with respect to use of the capability for path encoding to support stateless unicast routing, the capability for path encoding also may be used to support stateless multicast routing. In at least some embodiments, the capability for path encoding enables forwarding of a packet from a source element to multiple destination elements via a multicast distribution tree by determining an encoding of the multicast distribution tree (e.g., where the multicast distribution tree may be represented as a graph), associating the encoding of the multicast distribution tree with the packet at an ingress node, and decoding the encoded multicast distribution tree at each of the transit devices along the multicast distribution tree to determine routing of the packet at each of the transit devices along the multicast distribution tree, thereby providing routing of the packet from the source element to each of the multiple destination elements.

It will be appreciated that, although primarily depicted and described with respect to use of the capability for path encoding to support specific types of packet forwarding, routing, and switching, various embodiments of the capability for path encoding may be used with various types of packet forwarding, routing, or switching technologies, such as packet, cell, or label forwarding, switching, or routing technologies (e.g., IPv4, IPv6, Ethernet, MPLS, Asynchronous Transfer Mode (ATM), or the like), or the like, as well as various combinations thereof.

It will be appreciated that, although primarily depicted and described with respect to use of the capability for path encoding within specific types of networks, various embodiments of the capability for path encoding may be used with various other types of networks (e.g., access networks, core networks, transport networks, wide area networks, transit carrier networks, Internet Service Provider (ISP) networks, enterprise networks, data center networks, or the like, as well as various combinations thereof).

In at least some embodiments, the capability for path encoding enables faster routing of packets via networks paths in various types of communication networks, since each of the transit nodes for a network path may determine the next hop for a given packet from information which, in at least some embodiments, is expected to include significantly fewer bits than a full address or full label.

In at least some embodiments, the capability for path encoding eliminates the need for transit nodes of a network path to perform lookups typically required for routing or forwarding of packets via network paths (e.g., address lookups for IP, label lookups for MPLS, or the like), which is typically the costliest and most power hungry aspect of node design due to its typical reliance on ternary content addressable memories in order to route packets along network paths.

In at least some embodiments, the capability for path encoding enables network paths to be arbitrarily complicated (which may including traversal of various middleboxes), thereby facilitating support for service chaining (e.g., group-based service chaining, personalized service chaining (e.g., on a per-application basis, on a per user basis, on a per tenant basis, and so forth), or the like), various types of sophisticated traffic engineering at various levels of granularity (e.g., per-flow, per-user, per-application, and so forth), or the like, as well as various combinations thereof.

In at least some embodiments, the capability for path encoding enables routing of packets over arbitrary paths (also commonly referred to as packet steering) in IP and Ethernet networks, which is not currently supported with conventional non-SDN based IP and Ethernet networks. It is noted that routing of packets over arbitrary paths may be provided at various levels of granularity (e.g., packet flows may be assigned arbitrary paths, individual packets within packet flows may be assigned arbitrary paths, or the like, as well as various combinations thereof).

In at least some embodiments, the capability for path encoding enables implementation of highly scalable Ethernet networks that can grow arbitrarily large since there is no data plane limitation on the forwarding path.

In at least some embodiments, the capability for path encoding is particularly well suited for use with SDN-based networks. For example, SDN may be configured to precompute each source-destination path, generate the appropriate encoding information for the source-destination paths, and download the encoding information to the sources of the source routed paths (e.g., physical switches, virtual switches, hosts, or the like, as well as various combinations thereof). For example, the capability for path encoding may use the control plane capabilities of SDN to disseminate encoding information to the edge nodes and transit nodes. It is noted that various other aspects or capabilities of SDN may be used or adapted to support various aspects of the capability for path encoding.

In at least some embodiments, the capability for path encoding enables implementation of high speed, high performance software switches without the need for hardware assisted address or label lookups, where such switches may be particularly well-suited for use in various types of virtualized environments (e.g., for SDN-based networks, NFV implementations, cloud applications, or the like).

In at least some embodiments, the capability for path encoding enables a new class of data switches in which the data switches are low cost, high reliability, and high performance data switches.

Figure 8:
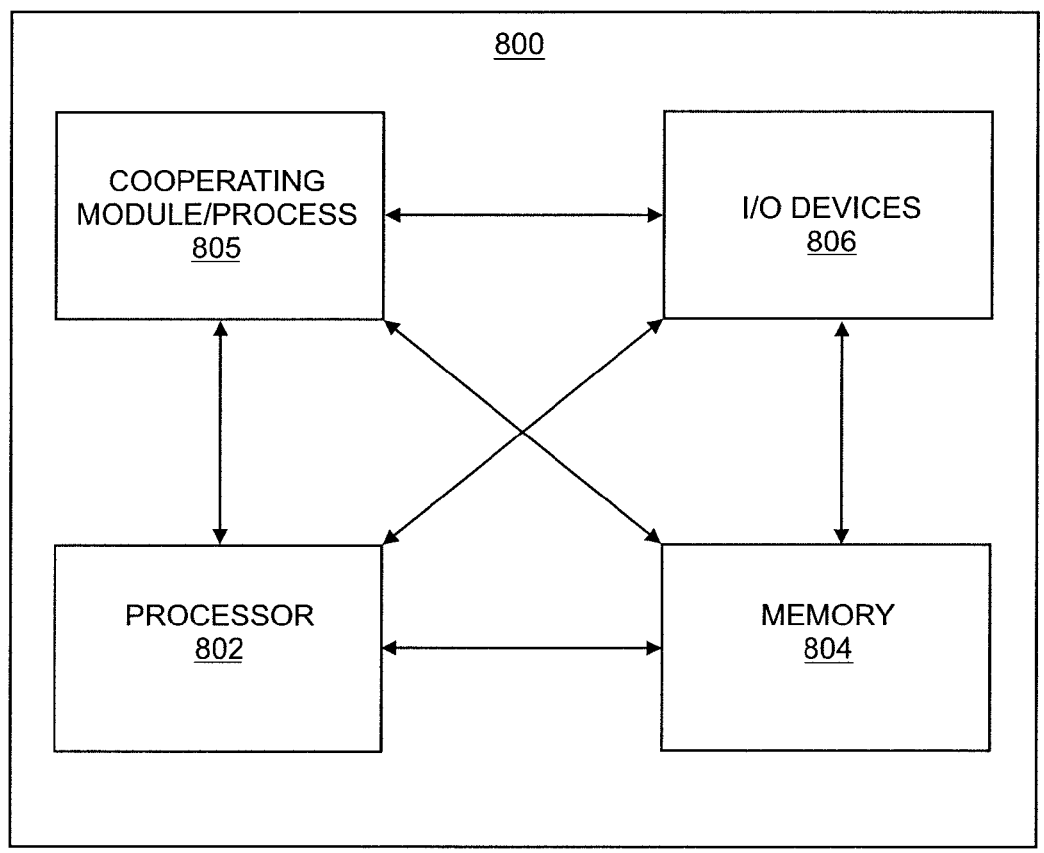
FIG. 8 depicts a high-level block diagram of a computer suitable for use in performing functions described herein.

FIG. 8 depicts a high-level block diagram of a computer suitable for use in performing functions described herein.

The computer 800 includes a processor 802 (e.g., a central processing unit (CPU) and/or other suitable processor(s)) and a memory 804 (e.g., random access memory (RAM), read only memory (ROM), and the like).

The computer 800 also may include a cooperating module/process 805. The cooperating process 805 can be loaded into memory 804 and executed by the processor 802 to implement functions as discussed herein and, thus, cooperating process 805 (including associated data structures) can be stored on a computer readable storage medium, e.g., RAM memory, magnetic or optical drive or diskette, and the like.

The computer 800 also may include one or more input/output devices 806 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 800 depicted in FIG. 8 provides a general architecture and functionality suitable for implementing functional elements described herein and/or portions of functional elements described herein. For example, the computer 800 provides a general architecture and functionality suitable for implementing an endpoint element 102, a portion of an endpoint element 102, a node 111, a portion of a node 111, controller 120, a portion of controller 120, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
determine a network path through a network, the network path comprising an ordered sequence of nodes of the network, the ordered sequence of nodes of the network path comprising an ordered sequence of three or more nodes of the network;
determine, for each of the nodes in the ordered sequence of nodes of the network path, a respective node output interface of the respective node that is to support the network path at the respective node;
determine, for each of the node output interfaces of each of the nodes in the ordered sequence of nodes of the network path, a respective node interface label representing the respective node output interface of the respective node in the ordered sequence of nodes of the network path; and
determine, based on the node interface labels representing the respective node output interfaces of the respective nodes in the ordered sequence of nodes of the network path, a path encoding label for the network path, the path encoding label for the network path comprising an ordered sequence of the node interface labels representing the respective node output interfaces of the respective nodes in the ordered sequence of nodes of the network path.

2. The apparatus of claim 1, wherein, to determine the path encoding label for the network path, the processor is configured to:
concatenate the node interface labels representing the respective node output interfaces of the respective nodes in the ordered sequence of nodes of the network path, based on the ordered sequence of the node interface labels representing the respective node output interfaces of the respective nodes in the ordered sequence of nodes of the network path, to form the path encoding label.

3. The apparatus of claim 2, wherein, to determine the respective node interface label representing the respective node output interface of the respective node in the ordered sequence of nodes of the network path, the processor is configured to:
determine the respective node with which the respective node output interface is associated;
determine an interface identifier of the respective node output interface; and
determine the respective node interface label for the respective node output interface based on a mapping of the interface identifier of the respective node output interface of the respective node to the respective node interface label for the respective node output interface of the respective node.

4. The apparatus of claim 1, wherein the path encoding label further comprises offset information configured for use by the respective nodes of the network path in identifying portions of the path encoding label associated with the respective nodes of the network path.

5. The apparatus of claim 1, wherein the processor is configured to:
generate a mapping of the network path to the path encoding label for the network path; and
propagate, toward a first node in the ordered sequence of nodes of the network path, the mapping of the network path to the path encoding label for the network path.

6. The apparatus of claim 1, wherein the nodes of the network path include at least a portion of a set of available nodes of the network, wherein each of the available nodes in the set of available nodes of the network comprises a respective set of node output interfaces, wherein the processor is configured to:
generate respective node interface labels for the respective node output interfaces of the respective available nodes in the set of available nodes of the network.

7. The apparatus of claim 6, wherein, for each of the available nodes in the set of available nodes of the network, the respective node interface labels for the node output interfaces of the respective available node are configured to be prefix-free.

8. The apparatus of claim 6, wherein, to generate the respective node interface labels for the respective node output interfaces of the nodes in the set of available nodes of the network, the processor is configured to:
assign, to each of the respective node output interfaces of each of the available nodes in the set of available nodes of the network, a respective length function li; and
create the respective node interface labels for the respective node output interfaces of the available nodes in the set of available nodes of the network such that the node interface labels satisfy the respective length functions li and a sum of 2(−li) over the node output interfaces of the available nodes in the set of available nodes of the network is equal to or less than one (1).

9. The apparatus of claim 8, wherein, to assign the respective length functions 2(−li) to the respective node output interfaces of the available nodes in the set of available nodes of the network, the processor is configured to:
formulate the assignment problem as a convex optimization problem;
determine a solution for the convex optimization problem; and
round the solution to satisfy integer constraints.

10. The apparatus of claim 1, wherein the processor is configured to:
receive a packet to be forwarded via the network path; and
associate the path encoding label of the network path with the packet.

11. A method, comprising:
  determining, by a processor, a network path through a network, the network path comprising an ordered sequence of nodes of the network, the ordered sequence of nodes of the network path comprising an ordered sequence of three or more nodes of the network;
  determining, by the processor for each of the nodes in the ordered sequence of nodes of the network path, a respective node output interface of the respective node that is to support the network path at the respective node;
  determining, by the processor for each of the node output interfaces of each of the nodes in the ordered sequence of nodes of the network path, a respective node interface label representing the respective node output interface of the respective node in the ordered sequence of nodes of the network path; and
  determining, by the processor based on the node interface labels representing the respective node output interfaces of the respective nodes in the ordered sequence of nodes of the network path, a path encoding label for the network path, the path encoding label for the network path comprising an ordered sequence of the node interface labels representing the respective node output interfaces of the respective nodes in the ordered sequence of nodes of the network path.

12. An apparatus, comprising:
  a processor and a memory communicatively connected to the processor, the processor configured to:
    receive a packet to be routed via a network path through a network, the network path comprising an ordered sequence of nodes of the network, the ordered sequence of nodes of the network path comprising an ordered sequence of three or more nodes of the network, the network path comprising, for each of the nodes in the ordered sequence of nodes of the network path, a respective node output interface of the respective node that is to support the network path at the respective node;
    determine, based on the packet, a path encoding label for the network path, the path encoding label for the network path comprising an ordered sequence of node interface labels representing the respective node output interfaces of the respective nodes of the ordered sequence of nodes of the network path;
    associate the path encoding label for the network path with the packet; and
    send the packet for propagation via the network path based on the path encoding label for the network path.

13. The apparatus of claim 12, wherein, to associate the path encoding label for the network path with the packet, the processor is configured to:
  add to the packet a header including the path encoding label.

14. The apparatus of claim 12, wherein, to associate the path encoding label for the network path with the packet, the processor is configured to:
  insert the path encoding label within one or more header fields of the packet.

15. The apparatus of claim 14, wherein the one or more header fields of the packet comprise one or more address fields of the packet.

16. The apparatus of claim 14, wherein the one or more header fields of the packet comprise a source address field of the packet and a destination address field of the packet.

17. The apparatus of claim 12, wherein the path encoding label further comprises offset information configured for use by the nodes of the network path in identifying respective portions of the path encoding label associated with the respective nodes of the network path.

18. The apparatus of claim 12, wherein the apparatus comprises a set of network interfaces, wherein, to send the packet for propagation via the network path based on the path encoding label for the network path, the processor is configured to:
  identify a portion of the path encoding label associated with the apparatus; and
  forward the packet via one of the network interfaces based on the portion of the path encoding label associated with the apparatus.

19. The apparatus of claim 18, wherein, to identify the portion of the path encoding label associated with the apparatus, the processor is configured to:
  identify a portion of the path encoding label comprising offset information; and
  identify the portion of the path encoding label associated with the apparatus based on the offset information.

20. The apparatus of claim 19, wherein, to identify the portion of the path encoding label associated with the apparatus based on the offset information, the processor is configured to:
  process the offset information to identify a bit position of the path encoding label that is storing a first bit of the portion of the path encoding label associated with the apparatus; and
  identify, beginning with the first bit of the portion of the path encoding label associated with the apparatus, a longest prefix-free set of bits of the path encoding label.

21. The apparatus of claim 20, wherein the processor is configured to:
  prior to forwarding the packet toward a next node of the network path:
    update the offset information to point to a first bit position of the path encoding label that is storing a first bit of a portion of the path encoding label that is associated with the next node of the network path.

22. The apparatus of claim 18, wherein, to identify the portion of the path encoding label associated with the apparatus, the processor is configured to:
  select a leftmost portion of the path encoding label associated with the apparatus that is prefix-free.

23. The apparatus of claim 22, wherein the processor is configured to:
  prior to forwarding the packet:
    remove, from the packet, the leftmost prefix-free portion of the path encoding label associated with the apparatus; and
    shift a remaining portion of the path encoding label to the left.

24. A method, comprising:
  receiving, by a processor, a packet to be routed via a network path through a network, the network path comprising an ordered sequence of nodes of the network, the ordered sequence of nodes of the network path comprising an ordered sequence of three or more nodes of the network, the network path comprising, for each of the nodes in the ordered sequence of nodes of the network path, a respective node output interface of the respective node that is to support the network path at the respective node;
  determining, by the processor based on the packet, a path encoding label for the network path, the path encoding label for the network path comprising an ordered sequence of node interface labels representing the respective node output interfaces of the respective nodes of the ordered sequence of nodes of the network path;

associating, by the processor, the path encoding label for the network path with the packet; and sending, by the processor, the packet for propagation via the network path based on the path encoding label for the network path.

* * * * *